Aug. 8, 1939.   E. W. DAVIS   2,168,396
LUBRICATING APPARATUS
Filed June 25, 1937   2 Sheets-Sheet 1

Inventor:
Ernest W. Davis
By Williams, Bradbury, McCaleb & Hinkle
Attys.

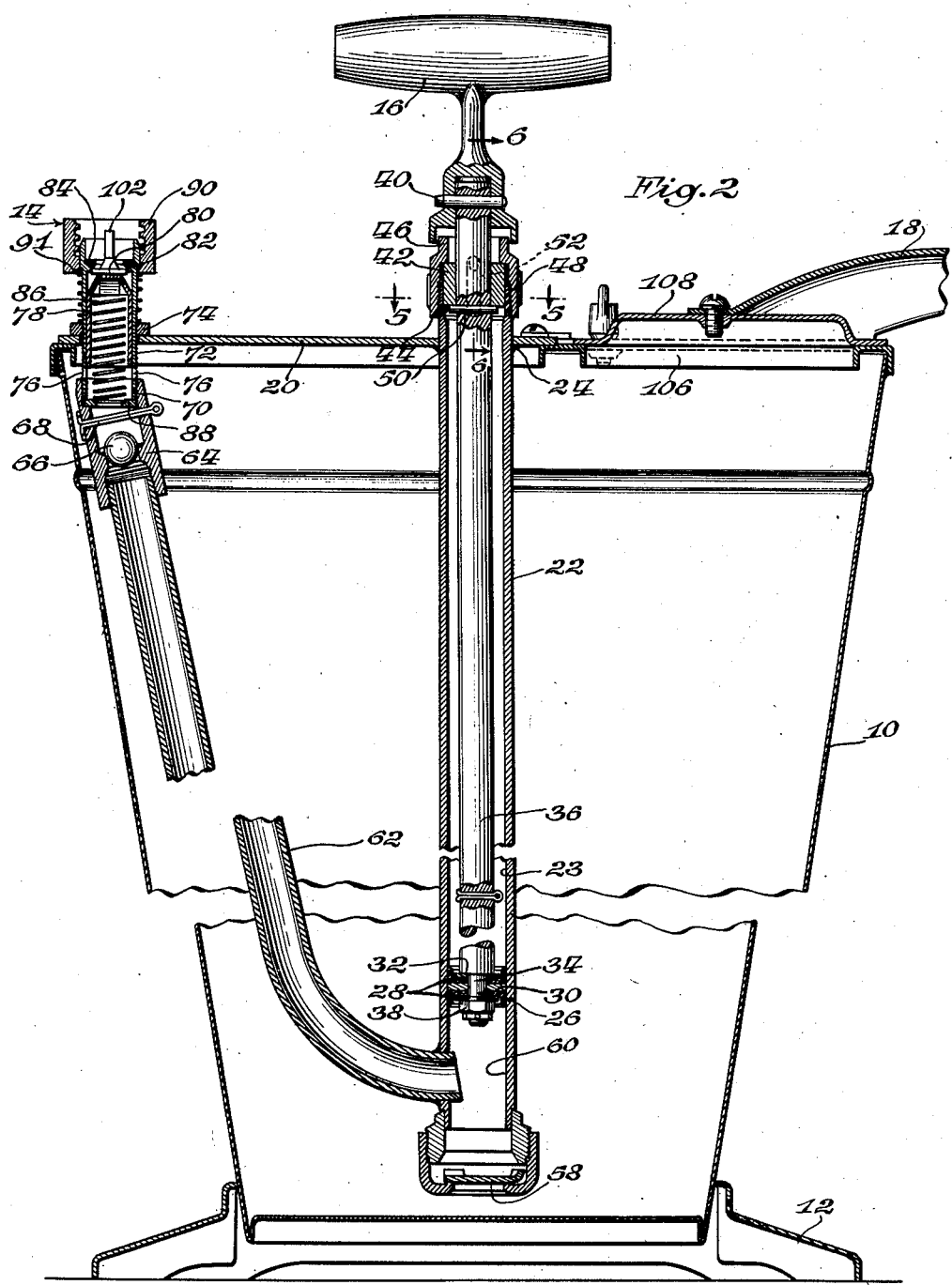

Patented Aug. 8, 1939

2,168,396

UNITED STATES PATENT OFFICE 2,168,396

LUBRICATING APPARATUS

Ernest W. Davis, Oak Park, Ill., assignor to Stewart-Warner Corporation, Chicago, Ill., a corporation of Virginia Application June 25, 1937, Serial No. 150,273

9 Claims. (Cl. 221—47.5)

The invention relates to lubricant apparatus and more particularly to means for filling or reloading the lubricant reservoirs of lubricant compressors.

One of the pressing needs of filling station attendants and others using lubricant compressors has been to have at hand a portable device for reloading hand guns and other lubricant compressors which is quick, convenient, simple, and easy to operate. In addition to this, it must be small in size, readily maneuvered and attached to or removed from the compressors it fills. Such a device, in order to be acceptable, must operate to reload the compressor without mess or any waste of time and lubricant.

In addition to these features, it is practically imperative to have a loader which eliminates air pockets from the body of the lubricant transferred to the compressor by it, and also one which handles the lubricant in such a way that there is no possibility of its becoming contaminated by foreign bodies, such as grit and dirt.

Another item of interest to those using a lubricant loader is that the loader should not spill lubricant when it is accidentally upset or left in an abnormal position for any length of time.

In view of these requirements and advantages, one of the objects of the invention is to provide a reloader for lubricant compressors which is convenient to handle and readily manipulated before, during, and after the compressor is attached thereto.

Another object of the invention is to provide an improved means for reloading lubricant compressors which prevents loss or waste of lubricant at any time.

Another object of the invention is to provide a means for reloading lubricant compressors which forces lubricant into the compressor under pressure and relieves itself automatically of residuary pressures when the compressor is detached from the means.

Another object of the invention is to provide an improved portable device for reloading lubricant compressors which is easily handled and readily manipulated.

Another object of the invention is to provide an improved lubricant dispenser which not only eliminates air pockets from the body of the lubricant delivered, but also prevents contamination thereof.

Another object of the invention is to provide an improved lubricant dispenser which will not permit any dispensing of grease until the gun to be reloaded is properly secured to the output nozzle thereof in a lubricant-sealed relationship.

Another object of the invention is to provide a portable lubricant dispenser which may be handled, moved, and operated with one hand.

Another object of the invention is to provide a lubricant loader or dispenser which is simple in construction and operation, effective in its use, and inexpensive to manufacture and maintain.

These being among the objects of the invention, other and further objects will become apparent from the drawings, the description relating thereto, and the appended claims, these and other objects being contemplated thereby.

Referring now to the drawings in general:

Fig. 2 is an enlarged vertical cross-section of the preferred embodiment illustrated in Fig. 1;

Figure 1:
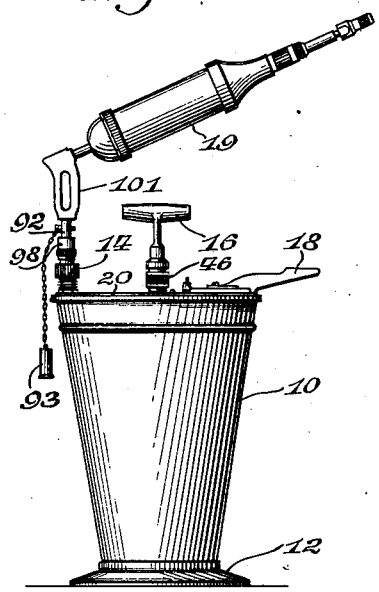
Fig. 1 is an elevation of a preferred embodiment of the invention shown with a lubricant compressor attached thereto.
Figure 3:
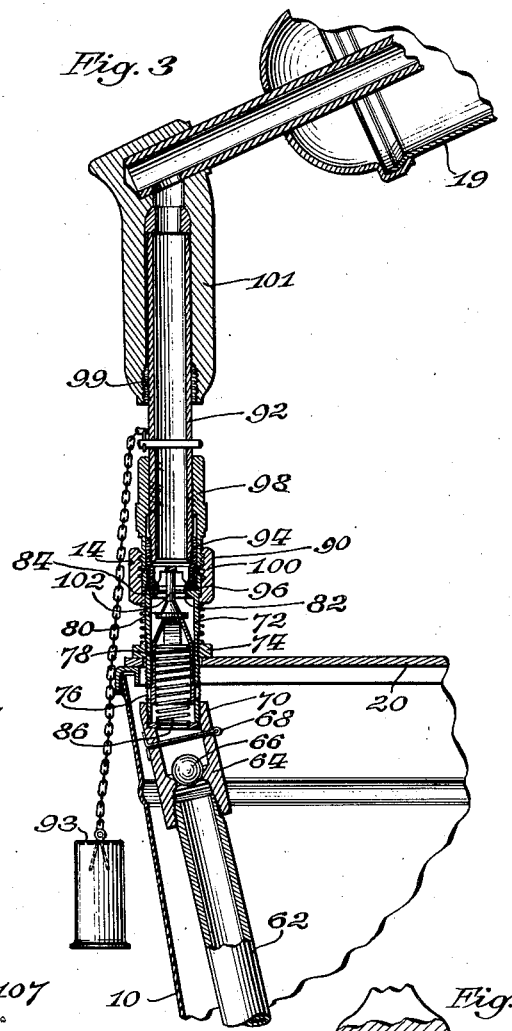
Fig. 3 is an enlarged vertical cross-section of a portion of the device illustrated in Fig. 1, showing the interconnection between said embodiment and lubricant compressor.

Referring now to the illustrated embodiment of the invention, shown in Fig. 1 in particular, the same comprises a lubricant storage container 10 with a supporting base 12 suitably secured thereto, a dispensing nozzle 14, a handle 16 preferably of T design, and a bracket 18 for holding in readiness lubricant compressors already reloaded, such as a hand compressor 19 which is about to be reloaded.

Referring now to Fig. 2, where the internal construction of the illustrated embodiment is shown in greater detail, a closure or top 20 is provided for the container 10 and is secured thereto in a suitable manner so that the weight of the whole assemblage can be borne by the top if, as is the case in the illustrated embodiment, the top is utilized for carrying the device.

A tube 22 projecting a short distance above the top 20 extends downwardly therethrough to a point adjacent the bottom of the container 10. Where it passes through the top 10, the tube 22 is secured thereto as by welding at 24. This tube serves as a working cylinder 23 for a piston 26 comprising two reversely faced cup washers 28 spaced by an intermediate washer 30 and held against the shoulder 32 of a reduced portion 34 of a piston rod 36, as by a nut and lock washer assembly 38.

The upper end of the piston rod 36 is secured to the handle 16 by means of a transverse pin 40 therethrough. A guide annulus 42 is provided in an enlarged upper portion 44 of the tube 22 where it is held against longitudinal displacement by a shouldered nut member 46 threaded upon the outer face of the tube as at 48.

Figures 5, 6:
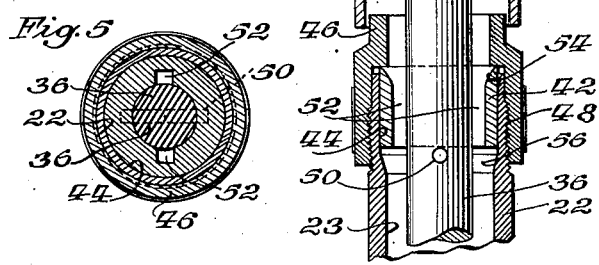
Fig. 5 is an enlarged section taken on the line 5—5 of Fig. 2.
Fig. 6 is an enlarged section taken on the line 6—6 of Fig. 2.

A bayonet pin 50 is carried by the piston rod 36 at a point upon the rod which is proximate to the lower portion of the guide annulus when the piston rod is in full downward thrust position. The guide member 42, as more particularly shown in Figs. 5 and 6, is provided with two longitudinal slots 52 rounded outwardly at their upper end, as at 54, for the reception of the ends of the bayonet pin 50. The lower ends of the slots 52 terminate in a circumferential groove 56 in which the pin may be rotated by a quarter turn from its normal slot-engaging position and held there against longitudinal displacement. In this way, the piston rod 36 is held downward in its lowermost position and the handle 16 may be employed to lift the complete container. Consequently, the handle 16 is not only used to actuate the piston 26, but when, upon occasion it is desired, the handle may be pushed downwardly carrying the bayonet pin therewith through the slots 52 to a point below the groove 56 in the guide 42, whereupon the handle can be turned a quarter turn and then used as a lifting or carrying means for the container.

At the lower end of the tube 22 is a foot valve 58 opening to permit a one-way flow of lubricant from the interior of the container 10 into the compression chamber 60 in the tube 22. An outlet tube 62 leads from the compression chamber 60 to a point adjacent the top 20, preferably near the peripheral edge thereof. Here the outlet tube 62 is provided with a check valve comprising an inwardly shouldered bushing 64 with a ball 66 lodged thereagainst and held against disassociation by a cross pin 68. The bushing is internally threaded at its upper end as at 70 to receive another tubular member 72 which extends through and is secured to the top 20 by a nut 74. Just below the point where the tubular member 72 passes through the top 20, this member is apertured as at 76 to communicate with the interior of the lubricant container, so that as long as the apertures are open and lubricant is propelled by the piston 26 through the tube 62, the lubricant is free to return to the container.

Slidably mounted within the tubular member 72 is a tubular piston 78 which carries a valve 80 at its upper end adapted to seat against a valve seat 82 afforded by an inwardly extending shoulder 84 formed integral with the tubular member 72. Against this seat, 82, the valve 80 as carried by the tubular piston 78 is resiliently urged at all times by a spring 86, supported at its lower end by another internal shoulder 88 also carried by the tubular member 72.

This valve and tubular piston construction are so arranged relative to the valve seat 82 and the apertures 76 that either the valve 80 or the apertures 76 is open when the other is closed, and also lubricant cannot leave the container when the valve 80 is closed.

Suitable means including a coarsely threaded nut 90 complementarily shouldered against removal from the tubular member 72, as at 91, is provided to engage and hold a lubricant compressor, such as the hand gun 20, in lubricant-transfer relationship. This means comprises, in addition to the nut 90, the nozzle 92 telescoping into the open end of the tube 72. The nozzle has a cap 93 chained thereto to keep the lubricant therein clean and carries an end piece 94 at its lower end which comes to rest against the shoulder 84 with a washer 96 therebetween to establish a sealed relationship. In addition to this, said means is provided with an outer sleeve 98 on the tube 92 having complementary threads engaging the threaded nut 90 as at 100, whereby the sealed relationship may be established and maintained between the tubes 72 and 92 respectively. The upper end of the tube 92, when uncapped, is adapted to slip into the reloading port 99 mating therewith and provided in the handle 101 of the compressor 19.

In order to open the valve 80 which prevents inadvertent lubricant flow therethrough, the valve is provided with an extension 102 which engages the end member 94 when the tube 92 is brought into juxtaposition with the tube 72. When the tube 92 is pressed downwardly at the time the compressor 19 is affixed for reloading, the end piece 94 bears on the extension 102 in a manner opening the valve. In this way, the axial extension 102 becomes an automatic opener for the valve when depressed by the end member 94 at the time the sealed relationship is established for reloading operations. The length of this axial extension 102 and its relation with the end member 94 is so arranged that the valve 80 is not only opened, but the aperture 76 is not fully closed until a lubricant-sealed relationship has been established between the nozzle 14 and the tube 92 of the lubricant compressor.

In this way, it will be seen that any lubricant under residuary pressure in the chamber may continue to escape back into the container until the seal between the lubricant being reloaded and the reloader is completed, so that there is no possibility of any loss of lubricant taking place before the seal is perfected.

As has been shown already, the only opening for the lubricant to leave the container under pressure is the opening controlled by the valve 80. Since this valve is never open until a means carried by the lubricant compressor depresses it at the time the union for lubricant between the reloader and the compressor is established, it will be appropriate to point out at this time that any possibility of lubricant leaking or spilling from the container at any time is practically eliminated.

Figure 4:
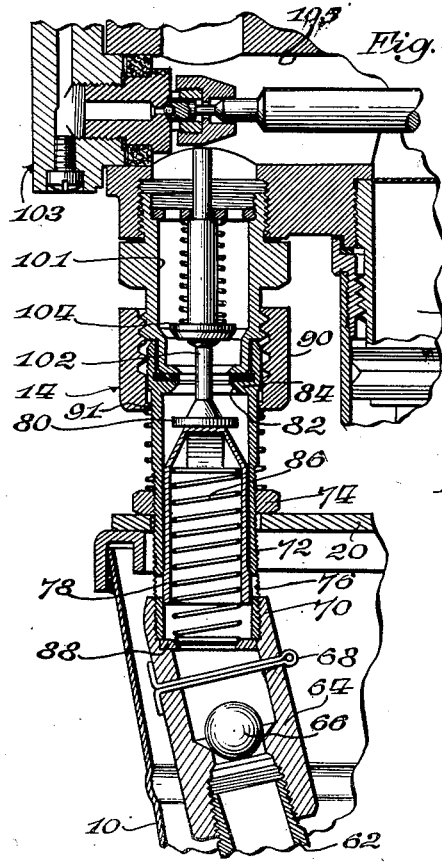
Fig. 4 is a view similar to Fig. 3, showing said preferred embodiment in engagement with another type of lubricant compressor.

In the event the reloader is used with a fluid pressure gun such as that shown by the numeral 103 in which the reloading passageway 105 and port 101 of the compressor are in open communication with the low pressure cylinder 107 at all times, a check valve, such as that indicated in Fig. 4 by the numeral 104, may be employed to prevent loss of lubricant from the fluid compressor after it has been removed from the reloader and the low pressure cylinder turned on. With such a valve construction wherein the valve is close to the opening, it will be seen that the illustrated embodiment of the invention is particularly well adapted to perform the reloading operation, since the axial extension 102 then operates not only to open the valve 80, but also the valve 104 carried by the fluid compressor.

Otherwise, the sealed relation for lubricant transfer is accomplished in the preferred manner already discussed.

Consequently, any lubricant compressor outfitted with a reloading port, such as that shown by numerals 99 or 101 and provided with a suitable threaded member to engage the nut 90, may be employed with the reloader illustrated. In this way, the reloader and its usefulness is not limited to any particular type of lubricant compressor, but may be used with all of them in a manner thoroughly acceptable to people using and reloading lubricant compressors.

The operation of the illustrated embodiment of the invention may be summarized briefly in stating that transportation of the container is accomplished by pushing the handle 16 downward and turning it until the bayonet pin 50 enters the circumferential groove 56, whereupon the container can be lifted and carried to any desired place in a shop or factory.

An adapter tube such as that shown by the numeral 92 is secured to the opening, if necessary, and the handle 101 of a compressor to be reloaded thrust down thereover, whereuon the thrust operates the valve 80 and closes the pressure relief apertures 76, after which the quarter turn of the handle may be reversed, the piston raised, and then plunged repeatedly, drawing lubricant through the trap valve 58 into the chamber 60, and from there ejecting it past the valve 64 through the valve 80 into the handle or loading port of the lubricant compressor. When the lubricant compressor is refilled to the extent desired, the initial release movement of the valve 80 opens the aperture 76 and permits any residual pressure existing in the chamber 60 to vent itself within the container 10. Further release and removal of the lubricant compressor from the discharge port 14 permits the valve 80 to close under the pressure of the spring 86 to prevent any escape of lubricant from the container.

The lubricant container 10 may be refilled itself through a suitable wide-mouthed opening, such as that shown by the numeral 106 in Fig. 2 which in turn may be tightly closed, except when refilling, by a cap 108.

Accordingly, although a preferred embodiment of the invention has been shown and described herein, it will be apparent to those skilled in the art that various uses, modifications, and changes may be made therein without departing from the spirit and substance of the invention, the scope of which is commensurate with the appended claims.

What is claimed is:

1. In a lubricant dispenser for reloading compressors, means for forcing lubricant from said dispenser under pressure comprising a working cylinder having inlet and outlet ports, a piston for drawing lubricant into said cylinder through said inlet port and forcing the lubricant through said outlet port under pressure, means for venting the said cylinder of lubricant pressure to permit free reciprocation of said piston when said dispenser is not reloading said compressor, a slotted keeper means carried by said cylinder for guiding said piston, means for reciprocating said piston, and a transverse pin member secured to said piston for engaging said keeper on either side thereof against axial displacement, whereby said dispenser may be operated and carried from place to place by said reciprocating means.

2. A lubricant dispensing device for reloading compressors or the like, comprising means for developing a pressure lubricant output, means for normally venting said output of said pressure, and means cooperative with said venting means for closing said venting means and for discharging said output to reload said compressor, and means carried by said compressor for actuating said last means.

3. A lubricant dispensing device for reloading compressors or the like, comprising a reservoir containing lubricant, a conduit terminating in a loading port for said compressors, pressure means for forcing said lubricant from said reservoir through said conduit, means in said conduit for normally venting said pressure means to said reservoir, and means closing said last means to render same entirely inoperative, including a valve actuated by said compressor when connected to said discharge port.

4. A lubricant dispensing device for reloading compressors or the like, comprising a reservoir containing lubricant, pressure means manually actuated at will for forcing said lubricant from said reservoir, a vent inside said reservoir for normally venting said pressure means to said reservoir, and means closing said vent, including a valve actuated by said compressor when connected to said discharge port for admitting lubricant under pressure to said compressor from said reservoir.

5. A lubricant dispensing device for reloading compressors or the like comprising a lubricant container, a normally closed valve means having a discharge port, pressure means for forcing lubricant from said container to said valve means, a vent normally venting said pressure to said container means associated with said valve means for closing said vent progressively when said valve means is opened, and means carried by said compressor for opening said valve means.

6. A lubricant dispensing device for reloading compressors or the like, comprising a lubricant container having a discharge port engageable with a compressor, pressure means continuously in communication with said port for forcing lubricant from said container to said discharge port, a vent normally venting said pressure to said container, means for normally preventing discharge of the lubricant from said port, and means carried by said compressor for rendering said associated means inoperative upon initial contact with said container and for completely closing said vent only when a sealed relationship is established between said compressor and said container.

7. A lubricant dispensing device for reloading fluid driven compressors or the like having lubricant ejecting parts therein movable only with substantial effort comprising means for developing a lubricant output pressure of substantial degree for moving said parts and recharging said compressor with a full load of lubricant, a conduit having a vent opening therein for conveying said lubricant to a place of delivery, means for engaging the reloading port of said high pressure fluid driven compressors in a readily detachable sealed relationship, and means associated with said port engaging means for closing said vent opening during said sealed relationship and for automatically opening said vent opening upon initial disengagement of said compressor and dispensing device to prevent loss of lubricant.

8. In combination with a lubricant compressor to be reloaded, a container for lubricant, means carried by said container for engaging said compressor in a supported sealed relationship, common means for forcing a portion of said lubricant into said compressor to reload same and for carrying said dispenser and compressor from one place to another in their engaged relationship and means for securing said common means against movement when said common means is to be used for carrying said dispenser and compressor.

9. A lubricant dispensing device for reloading compressors or the like, comprising a reservoir containing lubricant, a pump means for forcing said lubricant out of said reservoir through an outlet conduit having a vent aperture through the wall thereof opening directly into said reservoir, means for closing said vent aperture, and means for operating said closing means when the output end of said conduit is placed in sealed contact with the reloading opening of a compressor.

ERNEST W. DAVIS.